(12) United States Patent
Heo et al.

(10) Patent No.: US 10,297,186 B2
(45) Date of Patent: May 21, 2019

(54) DISPLAY DEVICE AND IMAGE PROCESSING METHOD THEREOF

(71) Applicant: LG Display Co., Ltd., Seoul (KR)

(72) Inventors: Cheon Heo, Paju-si (KR); KyungJoon Kwon, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 1 day.

(21) Appl. No.: 15/802,228

(22) Filed: Nov. 2, 2017

(65) Prior Publication Data

US 2018/0151104 A1 May 31, 2018

(30) Foreign Application Priority Data

Nov. 30, 2016 (KR) .................... 10-2016-0162059

(51) Int. Cl.
| | |
|---|---|
| *G09G 3/20* | (2006.01) |
| *G09G 5/10* | (2006.01) |
| *H04N 1/60* | (2006.01) |
| *G09G 5/02* | (2006.01) |
| *G09G 3/36* | (2006.01) |

(52) U.S. Cl.
CPC ......... *G09G 3/2077* (2013.01); *G09G 3/2003* (2013.01); *G09G 3/2074* (2013.01); *G09G 3/3648* (2013.01); *G09G 5/026* (2013.01); *G09G 5/10* (2013.01); *H04N 1/6005* (2013.01); *G09G 2300/0452* (2013.01); *G09G 2320/066* (2013.01); *G09G 2320/0666* (2013.01); *G09G 2340/06* (2013.01); *G09G 2340/16* (2013.01); *G09G 2360/16* (2013.01)

(58) Field of Classification Search
CPC .... G09G 3/2077; G09G 3/3648; G09G 5/026; G09G 3/2003; G09G 5/10; G09G 3/2074; G09G 2300/0452; G09G 2320/0666; G09G 2340/06; G09G 2320/066; G09G 2360/16; G09G 2340/16; H04N 1/6005
USPC ......................................................... 345/591
See application file for complete search history.

(56) References Cited

U.S. PATENT DOCUMENTS

| | | | | |
|---|---|---|---|---|
| 2009/0022395 | A1* | 1/2009 | Cho | .................. H04N 1/60 382/167 |
| 2009/0263016 | A1* | 10/2009 | Kuo | .............. G06T 7/0002 382/167 |
| 2010/0195173 | A1* | 8/2010 | Dalrymple | ............ G06T 1/00 358/520 |

(Continued)

FOREIGN PATENT DOCUMENTS

| | | |
|---|---|---|
| KR | 10-2011-0047669 A | 5/2011 |
| KR | 10-2015-0022235 A | 3/2015 |

*Primary Examiner* — Ke Xiao
*Assistant Examiner* — Kim Thanh T Tran
(74) *Attorney, Agent, or Firm* — Fenwick & West LLP

(57) ABSTRACT

Provided are a display device and an image processing method thereof. The display device according an embodiment includes a display panel including pixels formed of red, green, blue, and white sub pixels, an image processing unit that converts a three-color input image supplied to the red, green, blue, and white sub pixels into four-color image data, calculates a color contrast ratio using a luminance weight and a hue weight by scaling luminance and hue values of the input image, and outputs an output image by considering the color contrast ratio, and a timing controller which aligns and outputs the output image from the image processing unit.

18 Claims, 5 Drawing Sheets

(56) References Cited

U.S. PATENT DOCUMENTS

| | | | |
|---|---|---|---|
| 2011/0090362 A1* | 4/2011 | Yanagita | H04N 1/6027 |
| | | | 348/222.1 |
| 2015/0054864 A1 | 2/2015 | Choi | |
| 2015/0302558 A1* | 10/2015 | Kobayashi | G06T 5/002 |
| | | | 382/167 |
| 2016/0088229 A1* | 3/2016 | Park | G06T 11/60 |
| | | | 348/239 |
| 2017/0278474 A1* | 9/2017 | Nakanishi | B60R 1/00 |
| 2018/0115705 A1* | 4/2018 | Olsson | G06T 5/50 |

* cited by examiner

DISPLAY DEVICE AND IMAGE PROCESSING METHOD THEREOF

CROSS-REFERENCE TO RELATED APPLICATION

This application claims priority under 35 U.S.C. § 119(a) of Republic of Korea Patent Application No. 10-2016-0162059, filed on Nov. 30, 2016, which is incorporated herein by reference in its entirety.

BACKGROUND

Technical Field

The present disclosure relates to a display device, and more particularly, to a display device which may improve a luminance of an achromatic color in a RGBW type display device and an image processing method thereof.

Description of the Related Art

As the information-oriented age has come, display devices are rapidly spreading. Due to characteristics of the display device such as having a light weight, a thin thickness, and low power consumption, the display device is applied to a wide range of applications including a mobile phone, a PDA, a smart phone, a TV, a monitor, and a notebook computer.

The display device includes a liquid crystal display device (LCD), a plasma display panel device (PDP), a field emission display device (FED), or an organic light emitting display device (OLED).

The display device includes a plurality of pixels defined by a plurality of data lines and a plurality of gate lines.

Each pixel of the display device includes red R, green G, and blue B sub pixels and the display device mixes light of red R, green G, and blue B sub pixels to implement one color image. However, in the display device which implements one color image by mixing light of the red R, green G, and blue B sub pixels, color filters disposed in each of the red R, green G, and blue B sub pixels transmit approximately one third of the applied light. Therefore, there is a drawback in that light efficiency is lowered as a whole.

In order to compensate such a drawback, a RGBW type display device which further includes a white sub pixel W in addition to the red R, the green G, and the blue B sub pixels has been suggested.

The RGBW type display device generates three-color amplifying data by multiplying red, green, and blue data by a set gain value and then extracts white data having the lowest gray scale level from the three-color amplifying data. The RGBW type display device subtracts white data extracted from the three-color amplifying data to generate four-color data.

The RGBW type display device generates four-color data and then applies a pixel gain in consideration of a saturation of the entire frame. Next, a final gain is calculated using a pixel gain and a frame gain, and then a color contrast ratio is calculated by a difference between the final gain of each pixel and a total average of the final gain of the entire frame. As described above, in the RGBW type display device, the color contrast ratio is collectively calculated for the entire frame.

However, since the RGBW type display device applies the color contrast ratio to the entire frame without considering a distance between pixels and a color sense such as a chromatic color and an achromatic color, the color contrast ratio is different from a color contrast ratio which is actually perceived by a human viewer.

SUMMARY

An aspect of the present disclosure is to provide a display device that calculates a color contrast ratio in consideration of a distance between pixels and a color difference to be similar to the color contrast ratio perceived by a human viewer of the display device. Another aspect of the present disclosure is to provide an image processing method thereof.

According to an embodiment of the present disclosure, there is provided a display device. The display device includes a display panel including a plurality of pixels formed of red, green, blue, and white sub pixels, and an image processing unit. The image processing unit is configured to convert a three-color input image supplied to the red, green, blue, and white sub pixels into four-color image data, calculate a color contrast ratio using a luminance weight and a hue weight by scaling luminance values and hue values, respectively, of the three-color input image, and output an output image generated using the color contrast ratio. The display device further includes a timing controller for outputting the output image from the image processing unit.

In one or more embodiments, the image processing unit is further configured to set the luminance weight to a first value responsive to determining that the luminance is greater than a first threshold luminance, and set the luminance weight to a second value responsive to determining that the luminance is less than a second threshold luminance. The second value may be less than the first value.

In one or more embodiments, the image processing unit is further configured to set first hue weights of yellow Y, cyan C, and magenta M colors of the four-color image data to be greater than second hue weights of other colors of the four-color image data.

In one or more embodiments, the image processing unit calculates the color contrast ratio by adding a saturation weight and a block absolute value of the four-color image data.

In one or more embodiments, the image processing unit multiplies a first mapping image of the three-color input image to which the luminance weight is reflected, a second mapping image of the three-color input image to which the saturation weight is reflected, a third mapping image of the three-color input image to which the hue weight is reflected, and a fourth mapping image to which the block absolute value is reflected to calculate the color contrast ratio.

In one or more embodiments, the image processing unit calculates the block absolute value based on a difference between an interpolation value and a final gain of the output image. The interpolation value is determined by dividing the three-color input image into a plurality of blocks and interpolating the plurality of blocks with an intermediate value.

In one or more embodiments, the image processing unit includes a RGBW converting unit for converting the three-color input image into the four-color image data, a luminance converting unit for converting a luminance of the three-color input image to determine the luminance weight according to the converted luminance, a saturation converting unit for converting a saturation of the three-color input image to determine the saturation weight according to the converted saturation, and a hue converting unit for converting a hue of the three-color input image to determine the hue weight according to the converted hue. The image processing unit further includes a color contrast ratio calculating unit for calculating the color contrast ratio using the luminance weight, the saturation weight, the hue weight, and the block absolute value. The image processing unit further includes a frame calculating unit for calculating a frame gain of the three-color input image, a pixel calculating unit for appling the color contrast ratio to calculate a pixel gain of the three-color input image, and a final gain calculating unit for calculating a final gain using the frame gain and the pixel gain.

In one or more embodiments, the image processing unit calculates the block absolute value to reflect position information of the sub pixels.

In one or more embodiments, the image processing unit calculates the final gain by adding the frame gain and the pixel gain.

According to an embodiment of the present disclosure, there is provided an image processing method including generating a first image including scaled versions of luminance values of an input image, generating a second image including scaled versions of hue values of the input image, calculating a color contrast ratio of the input image by combining at least the first and second images, and generating a four-color output image by processing another input image subsequent to the input image using the color contrast ratio.

In one or more embodiments, the first image is generated to include a first value responsive to determining that the luminance of the input image is greater than a first threshold luminance. And the first image is generated to include a second value responsive to determining that the luminance of the input image is less than a second threshold luminance, where the second value is less than the first value.

In one or more embodiments, the scaled versions of hue values includes first hue weights for yellow, cyan, and magenta and second hue weights for other colors, where the first hue weights are greater than the second hue weights.

In one or more embodiments, the method further includes generating a third image including scaled versions of saturation values of the input image. The color contrast ratio is calculated by combining at least the first, second, and third images.

In one or more embodiments, calculating the color contrast ratio further includes determining a plurality of blocks of a processed version of the input image, determining first blocks of the plurality of blocks having a first average saturation value, determining second blocks of the plurality of blocks having a second average saturation value greater than the first average saturation value, and performing interpolation at a boundary area between the first blocks and the second blocks.

In one or more embodiments, calculating the color contrast ratio further includes determining interpolation values of pixels of the input image using the interpolation performed at the boundary area, determining an average gain of the plurality of blocks, determining block absolute values of the pixels of the input image by calculating differences between the average gain and the interpolation values, and generating a fourth image including the block absolute values.

According to an embodiment of the present disclosure, there is provided a display device including a display panel having a plurality of red, green, blue, and white sub pixels; and an image processing unit. The image processing unit is configured to generate a first image including scaled versions of luminance values of an input image, generate a second image including scaled versions of hue values of the input image, calculate a color contrast ratio of the input image by combining at least the first and second images, and generate a four-color output image by processing another input image subsequent to the input image using the color contrast ratio for display on the display panel.

In one or more embodiments, the image processing unit is further configured to generate a third image including scaled versions of saturation values of the input image. The color contrast ratio is calculated by combining at least the first, second, and third images.

In one or more embodiments, the image processing unit is further configured to determine a plurality of blocks of a processed version of the input image, determine first blocks of the plurality of blocks having a first average saturation value, determine second blocks of the plurality of blocks having a second average saturation value greater than the first average saturation value, and perform interpolation at a boundary area between the first blocks and the second blocks.

In one or more embodiments, the image processing unit is further configured to determine interpolation values of pixels of the input image using the interpolation performed at the boundary area. The color contrast ratio is calculated using at least the interpolation values.

In one or more embodiments, the image processing unit is further configured to determine an average gain of the plurality of blocks, determine block absolute values of the pixels of the input image by calculating differences between the average gain and the interpolation values, and generate a fourth image including the block absolute values. The color contrast ratio is calculated using at least the block absolute value.

In one or more embodiments, calculating the color contrast ratio of the input image includes multiplying the first, second, third, and fourth images.

In one or more embodiments, the first blocks represent a chromatic area of the input image and the second blocks represent an achromatic area of the input image.

In one or more embodiments, the scaled versions of hue values include first values and second values. The first values correspond to yellow Y, cyan C, and magenta M colors of the four-color image data, and the second values correspond to other colors of the four-color image data. The first values may be greater than the second values.

Other detailed matters of the embodiments are included in the detailed description and the drawings.

According to the present disclosure, a pixel gain is calculated by applying a color contrast ratio in consideration of a distance between pixels and a color feeling of a chromatic color and an achromatic color, thereby improving visibility of the display device.

BRIEF DESCRIPTION OF THE DRAWINGS

The accompanying drawings, which are included to provide a further understanding of the disclosure and are incorporated and constitute a part of this application, illustrate embodiments of the disclosure and together with the description serve to explain various principles. In the drawings.

DETAILED DESCRIPTION

Figure 1:
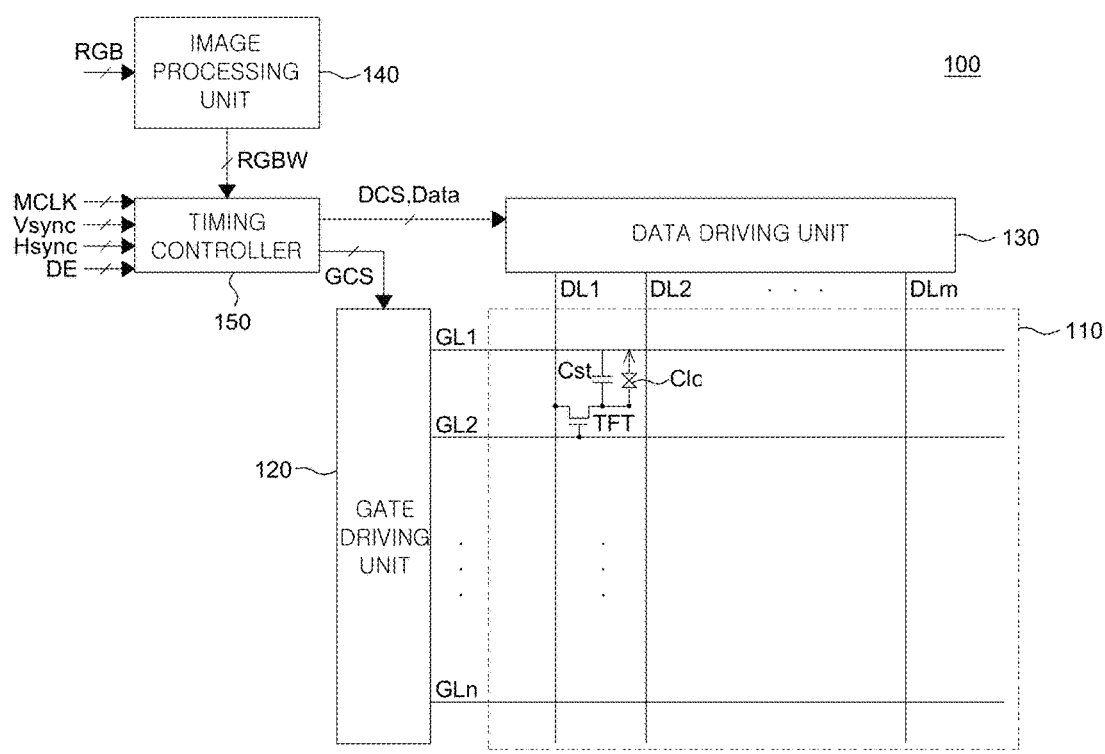
FIG. 1 is a block diagram schematically illustrating a display device according to an embodiment of the present disclosure.

Advantages and characteristics of the present disclosure and a method of achieving the advantages and characteristics will be clear by referring to embodiments described below in detail together with the accompanying drawings. However, the present disclosure is not limited to embodiments disclosed herein but will be implemented in various forms. The embodiments are provided by way of example so that a person of ordinary skilled in the art can fully understand the disclosures of the present disclosure and the scope of the present disclosure. Therefore, the present disclosure will be defined by the scope of the appended claims.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the specification and drawings. Further, in the following description of the present disclosure, a detailed explanation of known related technologies may be omitted to avoid unnecessarily obscuring the subject matter of the present disclosure. The terms such as "including" and "having" used herein are generally intended to allow other components to be added unless the terms are used with the term "only." Any references to singular may include plural unless expressly stated otherwise.

Components are interpreted to include an ordinary error range even if not expressly stated.

When the position relation between two parts is described using the terms such as "on," "above," "below," and "next," one or more parts may be positioned between the two parts unless the terms are used with the term "immediately" or "directly."

When an element or layer is disposed "on" other element or layer, another layer or another element may be interposed directly on the other element or therebetween.

Although the terms "first," "second," and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification and drawings.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways as understood by those skilled in the art, and the embodiments can also be carried out independently of or in association with each other.

Hereinafter, various embodiments of the present disclosure will be described in detail with reference to accompanying drawings.

FIG. 1 is a block diagram illustrating a display device 100 according to an embodiment of the present disclosure.

Referring to FIG. 1, a display device 100 according to an embodiment of the present disclosure includes a display panel 110, a gate driving unit 120, a data driving unit 130, an image processing unit 140, and a timing controller 150. In FIG. 1, even though the image processing unit 140 and the timing controller 150 are described as separate components, the image processing unit 140 may be included in the timing controller 150 or the image processing unit 140 and the timing controller 150 may be configured to be integrated.

In the display panel 110, m data lines DL1, DL2, . . . DLm are disposed in a first direction and n gate lines GL1, GL2, . . . , and GLn are disposed in a second direction that intersects the first direction. Further, in the display panel 110, a plurality of pixels may be located at intersections of the m data lines DL1, DL2, . . . DLm and n gate lines GL1, GL2, . . . , and GLn.

A pixel may include red R, green G, blue B, and white W sub pixels, as well as a thin film transistor TFT, a storage capacitor Cst, a liquid crystal capacitor Clc, a pixel electrode, and a common electrode.

The thin film transistor TFT is turned on according to a gate signal supplied from the gate lines GL1, GL2, . . . , and GLn to supply a data signal Data supplied from the data lines DL1, DL2, . . . DLm to the corresponding pixel.

The storage capacitor Cst functions to maintain a voltage of the corresponding pixel for a predetermined period.

The pixel may include liquid crystal molecules which are driven by an electric field between a pixel electrode to which the data signal Data is supplied through the thin film transistor TFT and a common electrode to which a common voltage is applied. In an embodiment, the pixel is configured by the common electrode and the pixel electrode connected to the thin film transistor TFT so that it may be equivalently represented as a liquid crystal capacitor Clc. The pixel includes the storage capacitor Cst to maintain the data signal charged in the liquid crystal capacitor Clc, e.g., until a next data signal is charged.

In the display panel 110, red R, green G, blue B, and white W sub pixels are formed in the first direction of the sub pixel. The sub pixels may be formed in a repeating pattern in a given direction. In the red R, green G, and blue B sub pixels (e.g., excluding the white W sub pixel), a color filter corresponding to each color may be disposed, e.g., a red color filter, green color filter, and blue color filter. Further, the red R, green G, blue B, and white W sub pixels may form a stripe structure with the same size ratio or different size ratios. In an embodiment, the red R, green G, blue B, and white W sub pixels may be disposed in an up, down, left, and right configuration, that is, disposed in a 2×2 matrix.

Further, the display device 100 according to an embodiment of the present disclosure may further include a backlight and a backlight driving unit. In some embodiments of the present disclosure, a liquid crystal display panel is described as an example of the display panel 110. However, the display panel 110 is not limited thereto and the display panel 110 may be an organic light emitting display panel or another type of display panel.

The gate driving unit 120 sequentially applies a "gate on voltage" to n gate lines GL1, GL2, . . . GLn in response to a gate control signal GCS input from the timing controller 150. The gate driving unit 120 may include a shift register that sequentially generates the "gate on voltage."

The data driving unit 130 receives a data control signal DCS from the timing controller 150 to convert four-color data (e.g., aligned in the timing controller 150) into an image signal that is an analog signal. The data driving unit 130 supplies the image signal to the m data lines DL1, DL2, . . . DLm.

When input images having red R, green G, and blue B colors are input from outside the display device 100, the image processing unit 140 may convert the input image into four-color image data R'G'B'W'. The image processing unit 140 may calculate a frame gain and a pixel gain of each of the red, green, blue, and white sub pixels to which the four-color image data R'G'B'W' is input. The image processing unit 140 calculates a "final gain" using the frame gain and the pixel gain and outputs an output image to which the final gain is reflected to the timing controller 150. Note that the term "final gain" as used herein does not necessarily indicate that the "final gain" is the final or last gain calculated by the image processing unit 140. Moreover, the image processing unit 140 may calculate different "final gains" for multiple frames of input images. In some embodiments, when the pixel gain is calculated, the image processing unit 140 calculates a color contrast ratio for the input image in consideration of all (or some of) a distance between pixels, a luminance weight, a saturation weight, and a hue weight. The image processing unit 140 calculates a pixel gain using the calculated color contrast ratio. Therefore, a pixel gain that accounts for perception of a human (e.g., a viewer of an image displayed by the display device 100) is applied to improve a display quality of the display device 100. A detailed configuration of the image processing unit 140 as described above will be described with reference to FIG. 2.

The timing controller 150 receives the four-color image data RGBW from the image data processing unit 140 to supply the four-color image data to the data driving unit 130. Further, the timing controller 150 generates a gate control signal GCS and a data control signal DCS that control an operation timing of the gate driving unit 120 and the data driving unit 130, respectively, for example, using timing signals such as a main clock MCLK, a data enable signal DE, a vertical synchronizing signal Vsync, and a horizontal synchronizing signal Hsync, which may be input from outside the display device 100.

Figure 2:
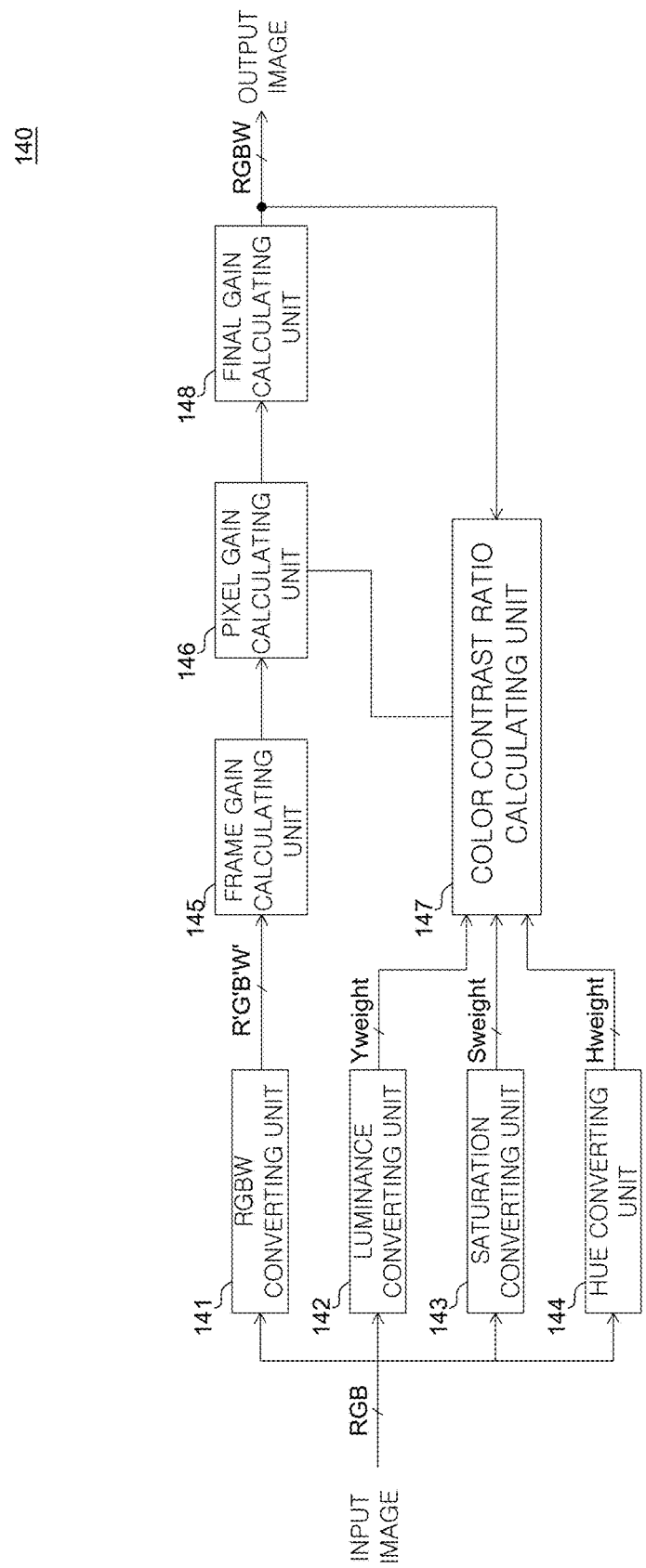
FIG. 2 is a block diagram schematically illustrating a configuration of an image processing unit of the display device shown in FIG. 1 according to an embodiment.
Figure 3:
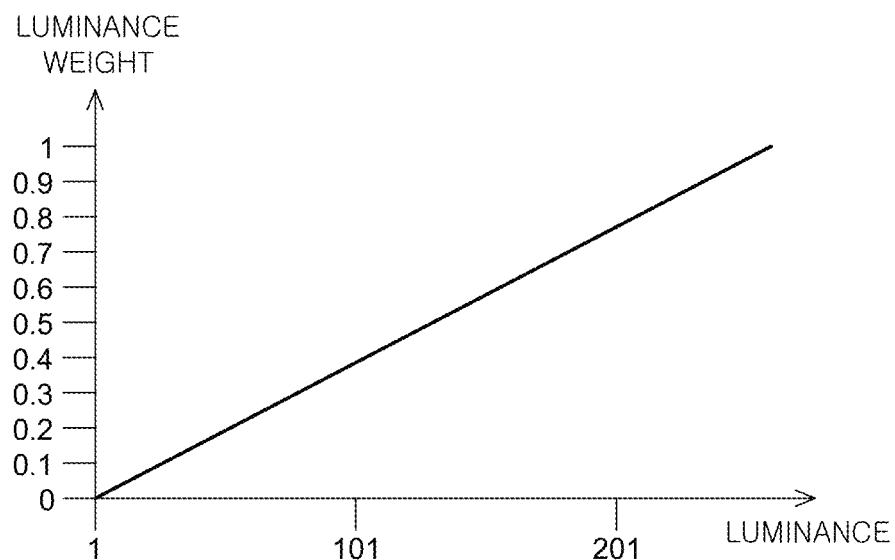
FIG. 3 is a graph illustrating a luminance and a luminance weight to be applied to a pixel for processing of an input image by a luminance converting unit of the image processing unit shown in FIG. 2 according to an embodiment.
Figure 4:
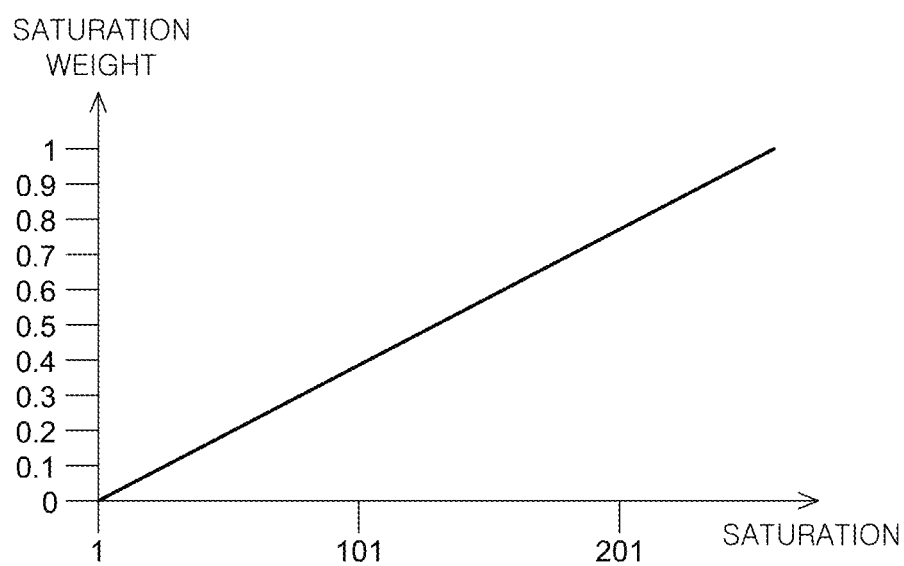
FIG. 4 is a graph illustrating a saturation and a saturation weight to be applied to a pixel for processing of an input image by a saturation converting unit of the image processing unit shown in FIG. 2 according to an embodiment.
Figure 5:
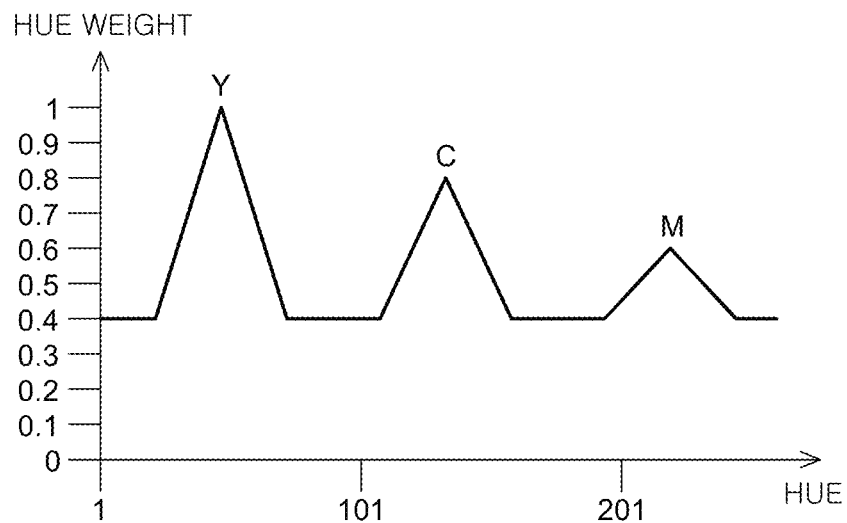
FIG. 5 is a graph illustrating a hue and a hue weight to be applied to a pixel for processing of an input image by a hue converting unit of the image processing unit shown in FIG. 2 according to an embodiment.
Figure 6:
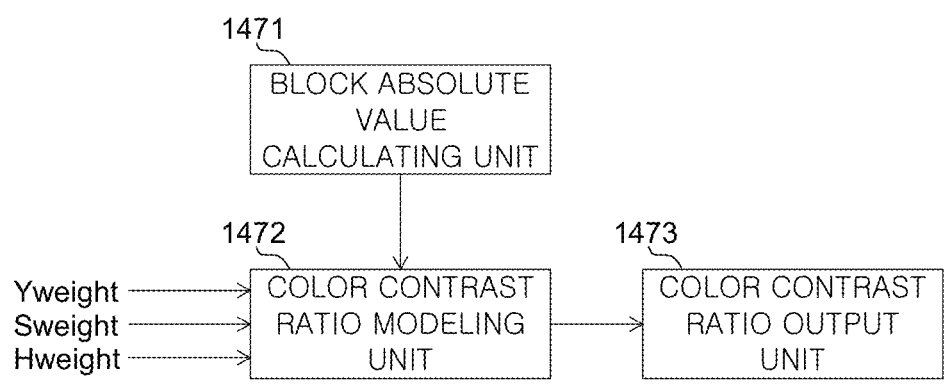
FIG. 6 is a block diagram schematically illustrating a configuration of a color contrast ratio calculating unit of the image processing unit shown in FIG. 2 according to an embodiment.

FIG. 2 is a block diagram schematically illustrating a configuration of an image processing unit 140 of the display device 100 shown in FIG. 1 according to an embodiment. FIG. 3 is a graph illustrating a luminance and a luminance weight to be applied to a pixel for processing of an input image by a luminance converting unit 142 of the image processing unit 140 shown in FIG. 2 according to an embodiment. FIG. 4 is a graph illustrating a saturation and a saturation weight to be applied to a pixel for processing of an input image by a saturation converting unit 143 of the image processing unit 140 shown in FIG. 2 according to an embodiment. FIG. 5 is a graph illustrating a hue and a hue weight to be applied to a pixel for processing of an input image by a hue converting unit 144 of the image processing unit 140 shown in FIG. 2 according to an embodiment. FIG. 6 is a block diagram schematically illustrating a configuration of a color contrast ratio calculating unit 147 of the image processing unit 140 shown in FIG. 2 according to an embodiment.

Referring to FIG. 2, the image processing unit 140 according to an embodiment of the present disclosure includes an RGBW converting unit 141, a luminance converting unit 142, a saturation converting unit 143, a hue converting unit 144, a frame gain calculating unit 145, a pixel gain calculating unit 146, a color contrast ratio calculating unit 147, and a final gain calculating unit 148. In an embodiment, the RGBW converting unit 141, the luminance converting unit 142, the saturation converting unit 143, and the hue converting unit 144 of the image processing unit 140 use a three-color input image so that the RGBW conversion, luminance weight determination, saturation weight determination, and hue weight determination may be simultaneously performed.

The RGBW converting unit 141 converts the three-color input image of red R, green G, and blue B (e.g., input from outside of the display device 100) into four-color image data R'G'B'W' based on a spectrum exchange method or another suitable method of conversion. Generally, white light generated in the white W sub pixel of the display device includes light of red R wavelength, light of green G wavelength, and light of blue B wavelength. Therefore, according to the spectrum exchange method, the RGBW converting unit 141 may reduce a light amount of the red R, green G, and blue B sub pixels by as much as a light amount of red R, green G, and blue B generated in the white W sub pixel. In an embodiment, the RGBW converting unit 141 subtracts three-color data (e.g., input to the sub pixels of red R, green G, and blue B) from the three-color input image RGB. Further, the RGBW converting unit 141 generates white data (e.g., supplied to the white W sub pixel) to convert the three-color input image RGB into four-color image data R'G'B'W'.

In an embodiment, the luminance converting unit 142 converts a luminance Y of a three-color input image of red R, green G, and blue B input from outside the display device 100 to map the luminance. When the luminance is mapped (e.g., scaled), a viewer of the display device 100 may easily recognize a difference in the luminance of a part (e.g., area) of a displayed image having a high luminance, and the viewer may recognize to a lesser degree a difference in luminance of a different part of the displayed image having a low luminance. In other words, the viewer may perceive differences in luminance with more sensitivity at higher lumaninces than at lower luminances. Therefore, a weight of an area having a high luminance is set to be high and a weight of an area having a low luminance is set to be low. As described above, an example relationship between the luminance and the luminance weight is illustrated in FIG. 3. More specifically, referring to the example graph of FIG. 3, since white corresponds to a color having a high luminance (for example, a part having a high luminance), a pixel representing white may have a luminance value of 255 (e.g., corresponding to a maximum value of 8-bit image data). Therefore, a luminance weight corresponding to the luminance value of 255 may be 1. As another example based on the example graph of FIG. 3, when a luminance value of a pixel representing yellow is 80, a luminance weight may be 0.3. The example graph of FIG. 3 illustrates that the luminance is proportional to the luminance weight, but the present disclosure is not limited thereto and may be modified according to a design. For example, the luminance weight may scale linearly or non-linearly with the luminance.

The saturation converting unit 143 converts a saturation of the three-color input image of red R, green G, and blue B input from outside the display device 100 to map (e.g., scale) the saturation. In an embodiment, the saturation may be calculated by dividing a minimum value of the three-color input image by an average value of the three-color input image. Therefore, responsive to the saturation converting unit 143 determining that the saturation value is close to 0, the color is determined as a chromatic color (e.g., a color not mixed with black or white color) and responsive to determining that the saturation value is close to 1, the color is determined as an achromatic color (e.g., a color mixed with black or white color). However, in some image processing or saturation mapping methods, a saturation value of 1 is mapped to be (e.g., associated with) a chromatic color and a saturation value of 0 is mapped to be (e.g., associated with) an achromatic color. Therefore, when the saturation of the input image is converted to be mapped, the saturation converting unit 143 may invert the color mappings. Further, as illustrated in FIG. 4, the saturation and the saturation weight Sweight may have a proportional relationship. That is, when a saturation of the pixel is high, a high saturation weight may be applied to the pixel, and when a saturation of the pixel is low, a low saturation weight may be applied to the pixel. The example graph of FIG. 4 illustrates that the saturation is proportional to the saturation weight, but the present disclosure is not limited thereto and may be modified according to a design. For example, the saturation weight may scale linearly or non-linearly with the saturation. In some embodiments, an initial value of the saturation weight Sweight may be set to be an intermediate (e.g., non-zero) value rather than 0.

The hue converting unit 144 converts a hue of three-color input image of red R, green G, and blue B input from outside the display device 100 to map the hue. In an embodiment, since the hue does not have a white value, only white is converted to be mapped (e.g., scaled) by the hue converting unit 144. As illustrated in FIG. 5, the hue converting unit 144 may determine hue weights of yellow Y, cyan C, and magenta M perceived by a viewer of the display device 100 when a luminance is low that are higher than hue weights of other colors. Therefore, a high hue weight Hweight (e.g., relative to hue weights for colors having other hue values) may be applied to a pixel which represents yellow Y, cyan C, and magenta M.

As described above, the display device 100 according to an embodiment of the present disclosure applies a high hue weight to a pixel to which hue data (e.g., easily perceived by the viewer when a luminance is dark) is input in consideration of both the luminance and the hue to process the input image. Therefore, a display quality of the display device 100 may be improved.

The frame gain calculating unit 145 calculates a frame gain of red R, green G, blue B, and white W sub pixels for the input image. In an embodiment, the frame gain calculating unit 145 equally multiplies sub pixel data of each color in a corresponding frame of the input image by the calculated frame gain so that absolute luminance is changed without changing a color sense of the frame.

The pixel gain calculating unit 146 calculates a pixel gain for a pixel according to a saturation of the input image. In an embodiment, the pixel gain calculating unit 146 may calculate a saturation value by dividing the minimum of a three-color input image data by the average value of the three-color input image data. The pixel gain calculating unit 146 calculates a pixel gain according to the calculated saturation value. In some embodiments, the pixel gain calculating unit 146 calculates the pixel gain for every pixel according to the saturation value so that pixels in the achromatic area and pixels in the chromatic area may have different pixel gains. For example, responsive to the pixel gain calculating unit 146 determining that red data, green data, and blue data of 8 bit of pixel data are 250, 250, and 250, respectively, the pixel may be determined as a pixel in an achromatic area having no saturation. In this case, a saturation value of the pixel in the achromatic area is 1, and a saturation value of the pixel in the chromatic area is 0. Therefore, the pixel gain calculating unit 146 determines that as the saturation value becomes closer to 1, the pixel more represents an achromatic color, and as the saturation value becomes closer to 0, the pixel more represents a chromatic color. Further, when the pixel gain is calculated, the pixel gain calculating unit 146 may consider a color contrast ratio calculated by considering a block absolute value to which a luminance weight Yweight, a saturation weight Sweight, a hue weight Hweight, and/or a distance between pixels are reflected.

The color contrast ratio calculating unit 147 may multiply images processed by components of the image processing unit 140. For example, the color contrast ratio calculating unit 147 multiplies (i) an image to which a block absolute value in which a distance between pixels of the input image is considered is mapped, (ii) an image to which a luminance weight Yweight (e.g., as shown in FIG. 3) is mapped, (iii) an image to which a saturation weight Sweight (e.g., as shown in FIG. 4) is mapped, and (iv) an image to which a hue weight Hweight (e.g., as shown in FIG. 5) is mapped to map an image obtained by modeling the color contrast ratio. The color contrast ratio calculating unit 147 may include a block absolute value calculating unit 1471, a color contrast ratio modeling unit 1472, and a color contrast ratio output unit 1473 as illustrated in FIG. 6.

The block absolute value calculating unit 1471 may calculate a block absolute value using the output frame image of a first frame of the input image. In an embodiment, the block absolute value calculating unit 1471 virtually divides the output frame image of the first frame of the input image into a plurality of blocks and calculates a gain average of the blocks. As described above, a reason why the block absolute value calculating unit 1471 virtually divides the output frame image of the first frame into the plurality of blocks is to consider position information for some or all of the blocks to reflect the distance of the pixel. For example, an average (e.g., gain average) of blocks in the chromatic area may be different from an average of blocks in the achromatic area. When the blocks have different values or average values, in order to suppress boundaries of the blocks from being perceived by the viewer, the block absolute value calculating unit 1471 may determine intermediate values of the blocks in a block boundary area to perform interpolation. When the interpolation is performed, the block absolute value calculating unit 1471 may calculate a block absolute value based on a difference between the final gain of the first frame and a block interpolation value. The block interpolation value may be a value in which a distance between pixels is considered by dividing the output frame image of the first frame into a plurality of blocks, and interpolating with the intermediate values of the blocks.

The color contrast ratio modeling unit 1472 may model the color contrast ratio using the block absolute value, the luminance weight Yweight, the saturation weight Sweight, and the hue weight Hweight. In an embodiment, the color contrast ratio modeling unit 1472 multiplies an image to which the block absolute value is mapped, an image to which the luminance weight Yweight is mapped, an image to which the saturation weight Sweight is mapped, and an image to which the hue weight Hweight is mapped to obtain an image obtained by modeling the color contrast ratio.

The color contrast ratio output unit 1473 may calculate and output the color contrast ratio of an image mapped by the color contrast ratio modeling unit 1472. For example, the color contrast ratio output unit 1473 adds a modeled color contrast ratio value of the chromatic area of the image and a modeled color contrast ratio value of the achromatic area to calculate the color contrast ratio of the entire frame.

Referring back to FIG. 2, the final gain calculating unit 148 adds the frame gain calculated in the frame gain calculating unit 145 and the pixel gain calculated in the pixel gain calculating unit 146 to calculate a final gain of one or more pixels.

As described above, the display device 100 according to the embodiment of the present disclosure may calculate the color contrast ratio by considering the luminance weight, the hue weight of the input image, and position information of the pixels to process the image data, e.g., similarly to the color contrast ratio perceived by the viewer. Therefore, the display device 100 according to the embodiment of the present disclosure may further improve visibility of the display device 100 to the viewer.

An image processing method of a display device 100 according to an embodiment of the present disclosure will be described in more detail with reference to FIG. 7.

Figure 7:
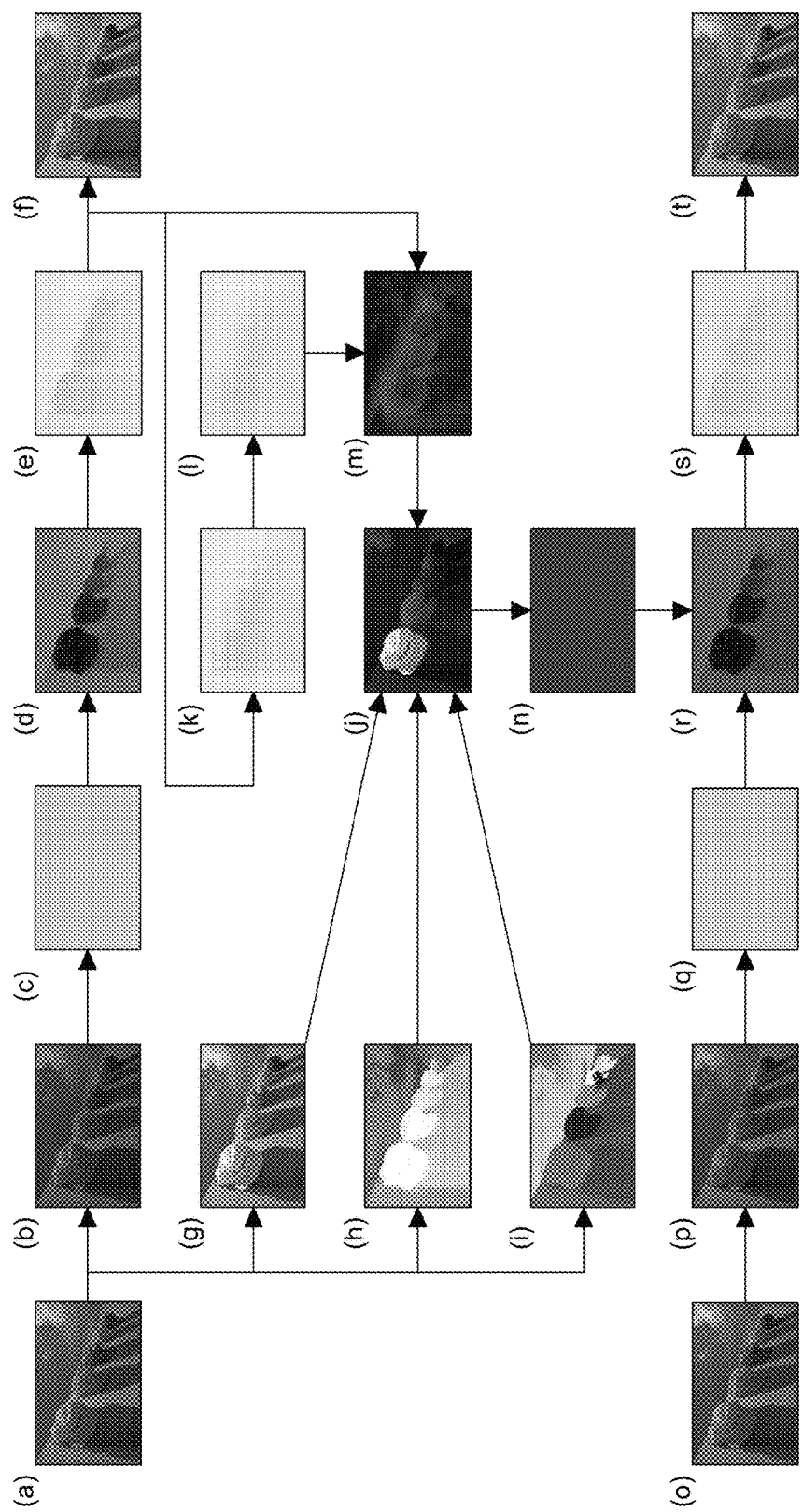
FIG. 7 is a diagram illustrating an example for explaining an image processing method of a display device according to an embodiment of the present disclosure.

FIG. 7 is a diagram illustrating an example for explaining an image processing method of a display device according to an embodiment of the present disclosure.

In the following example, the first frame of the input image and the output frame image denoted in FIGS. 1 to 6 are referred to as a first frame image and a first output frame image, respectively. Further, frame images input after the first frame image will be referred to as a second frame image, a third frame image, etc.

Referring to the example shown in FIG. 7, when a first frame image of an input image is input from outside the display device 100 to the image processing unit 140 as illustrated in step (a), the RGBW converting unit 141 converts the first frame image into a first frame image with four colors R'G'B'W' as shown in step (b).

The frame gain calculating unit 145 multiplies the sub pixels of four colors to which the first frame image is input as shown in step (c) by a predetermined set value to calculate a frame gain. In an embodiment, all sub pixels of the four colors are multiplied by the same set value so that the entire frame may have the same frame gain.

The pixel gain calculating unit 146, as shown in step (d), calculates a pixel gain of the sub pixels of four colors to which the first frame image is input. As described above, the pixel gain is calculated according to the saturation. Therefore, the pixel gain of the chromatic area CCA and the pixel gain of the achromatic area ACA may have different values.

The final gain calculating unit 148, as shown in step (e), calculates a final gain using the frame gain and the pixel gain. As described above, the final gain may be calculated by adding the frame gain and the pixel gain.

The image processing unit 140 applies the calculated final gain to the first frame image to output a first output frame image as shown in step (f).

As shown in step (a), when the first frame image is input, the luminance converting unit 142 converts the first frame image into an image mapped by reflecting a luminance weight (e.g., according to the graph of FIG. 3) as shown in step (g).

The saturation converting unit 143 converts the first frame image into an image mapped by reflecting a saturation weight (e.g., according to the graph of FIG. 4) as shown in step (h).

The hue converting unit 144 converts the first frame image into an image mapped by reflecting a hue weight (e.g. according to the graph of FIG. 5) as shown in step (i). Specifically, in step (i), when the hue weight Hweight is determined, for yellow Y, cyan C, and magenta M (e.g., which are easily perceived by the user according to the change in luminance), the hue weights Hweight thereof may be set to be greater than that of other colors.

The color contrast ratio modeling unit 1472 of the color contrast ratio calculating unit 147 multiplies the image to which the luminance weight Yweight is reflected to be mapped, the image to which the saturation weight Sweight is reflected to be mapped, and an image to which the hue weight Hweight is reflected to be mapped to model the image as shown in step (j). In an embodiment, at the time of modeling the image, an image to which the block absolute value is applied is also multiplied with the above images by the color contrast ratio modeling unit 1472 to be modeled.

A process of calculating the block absolute value will be described. As shown in step (k), the block absolute value calculating unit 1471 virtually divides the first output frame image into the plurality of blocks. As shown in step (i), the block absolute value calculating unit 1471 uses an intermediate value between blocks to perform the interpolation on the blocks, thereby suppressing the boundary of the blocks from being perceived. For example, as shown in step (l), the boundaries of the blocks have been diffused in comparison to the boundaries shown in step (k).

As shown in step (m), a difference between the final gain of the first output frame image and the block interpolation value of the blocks is calculated to calculate a block absolute value for a pixel. A version of the first frame image including the block absolute values of pixels of the first frame image is input to the color contrast ratio modeling unit 1472 in step (j). As shown in step (n), the color contrast ratio is calculated by the color contrast ratio modeling unit 1472 using an image modeled in step (j).

A second frame image is input to the image processing unit 140 as shown in step (o). As shown in step (p), the RGBW converting unit 141 converts the second frame image into a second frame image with the four colors R'G'B'W'.

The frame gain calculating unit 145 calculates the frame gain for the second frame image as shown in step (q). The pixel gain calculating unit 146 uses the frame gain and the color contrast ratio calculated in step (n) to calculate the pixel gain for the second frame image as shown in step (r).

The final gain calculating unit 148 adds the frame gain for the second frame image as shown in step (s) and the pixel gain (e.g., to which the color contrast ratio is reflected) to calculate the final gain for the second frame image.

The image processing unit 140 applies the final gain (to which the color contrast ratio is reflected) to the second frame image as shown in step (t) to output the second output image to the timing controller 150.

The image processing method of the display device 100 according to the embodiment of the present disclosure maps an input image with images according to a luminance weight and a hue weight in which a luminance and a hue are considered. In an embodiment, the image processing method multiplies images mapped using a block absolute value calculated by dividing a previous output image into a plurality of blocks (e.g., to reflect a distance between pixels) to calculate the final gain. Therefore, an output image may be modeled similarly to the color contrast ratio perceived by the viewer so that a display quality of the display device 100 may be improved.

The display device 100 according to the embodiment of the present disclosure reflects the color contrast ratio by considering the distance between pixels and hue and luminance information so that a high pixel gain may be applicable. For example, in an area of an image where the color contrast ratio is high, the pixel gain is lowered to adjust the hue, and in an area of the image where the color contrast ratio is low, the pixel gain is increased to increase the luminance so that a color contrast ratio similar to the color contrast ratio perceived by the viewer may be applied to the image.

Although the embodiments of the present disclosure have been described in detail with reference to the accompanying drawings, the present disclosure is not limited thereto and may be embodied in many different forms without departing from the technical concept of the present disclosure. Therefore, the embodiments of the present disclosure are described for illustrative purposes only but not intended to limit the technical spirit of the present disclosure. The scope of the technical spirit of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display device, comprising:
a display panel including a plurality of pixels formed of red, green, blue, and white sub pixels;
an image processing unit configured to:
convert a three-color input image supplied to the red, green, blue, and white sub pixels into four-color image data,
calculate a color contrast ratio using a luminance weight and a hue weight by scaling luminance values and hue values, respectively, of the three-color input image,
calculate the color contrast ratio by adding a saturation weight and a block absolute value of the four-color image data,
wherein the image processing unit multiplies a first mapping image of the three-color input image to which the luminance weight is reflected, a second mapping image of the three-color input image to which the saturation weight is reflected, a third mapping image of the three-color input image to which the hue weight is reflected, and a fourth mapping image to which the block absolute value is reflected to calculate the color contrast ratio, and
output an output image generated using the color contrast ratio; and
a timing controller for outputting the output image from the image processing unit.

2. The display device according to claim 1, wherein the image processing unit is further configured to:
set the luminance weight to a first value responsive to determining that the luminance is greater than a first threshold luminance; and
set the luminance weight to a second value responsive to determining that the luminance is less than a second threshold luminance, the second value being less than the first value.

3. The display device according to claim 1, wherein the image processing unit is further configured to:
set first hue weights of yellow Y, cyan C, and magenta M colors of the four-color image data to be greater than second hue weights of other colors of the four-color image data.

4. The display device according to claim 1, wherein the image processing unit calculates the block absolute value based on a difference between an interpolation value and a final gain of the output image, the interpolation value determined by dividing the three-color input image into a plurality of blocks and interpolating the plurality of blocks with an intermediate value.

5. The display device according to claim 4, wherein the image processing unit includes:
a RGBW converting unit for converting the three-color input image into the four-color image data;
a luminance converting unit for converting a luminance of the three-color input image to determine the luminance weight according to the converted luminance;
a saturation converting unit for converting a saturation of the three-color input image to determine the saturation weight according to the converted saturation;
a hue converting unit for converting a hue of the three-color input image to determine the hue weight according to the converted hue;
a color contrast ratio calculating unit for calculating the color contrast ratio using the luminance weight, the saturation weight, the hue weight, and the block absolute value;
a frame calculating unit for calculating a frame gain of the three-color input image;
a pixel calculating unit for applying the color contrast ratio to calculate a pixel gain of the three-color input image; and
a final gain calculating unit for calculating a final gain using the frame gain and the pixel gain.

6. The display device according to claim 5, wherein the image processing unit calculates the block absolute value to reflect position information of the sub pixels.

7. The display device according to claim 5, wherein the image processing unit calculates the final gain by adding the frame gain and the pixel gain.

8. An image processing method comprising:
generating a first image including scaled versions of luminance values of an input image;
generating a second image including scaled versions of hue values of the input image;
generating a third image including scaled versions of saturation values of the input image;
generating a fourth image including block absolute values in which a distance between pixels of the input image is considered;
calculating a color contrast ratio of the input image by multiplying at least the first, second, third, and fourth images; and
generating a four-color output image by processing another input image subsequent to the input image using the color contrast ratio.

9. The image processing method according to claim 8, wherein the first image is generated to include a first value responsive to determining that the luminance of the input image is greater than a first threshold luminance, and wherein the first image is generated to include a second value responsive to determining that the luminance of the input image is less than a second threshold luminance, the second value being less than the first value.

10. The image processing method according to claim 8, wherein the scaled versions of hue values includes first hue weights for yellow, cyan, and magenta and second hue weights for other colors, the first hue weights greater than the second hue weights.

11. The image processing method of claim 8, wherein calculating the color contrast ratio further includes:
   determining a plurality of blocks of a processed version of the input image;
   determining first blocks of the plurality of blocks having a first average saturation value;
   determining second blocks of the plurality of blocks having a second average saturation value greater than the first average saturation value; and
   performing interpolation at a boundary area between the first blocks and the second blocks.

12. The image processing method according to claim 11, wherein calculating the color contrast ratio further includes:
   determining interpolation values of the pixels of the input image using the interpolation performed at the boundary area;
   determining an average gain of the plurality of blocks;
   determining the block absolute values of the pixels of the input image by calculating differences between the average gain and the interpolation values; and
   generating the fourth image including the block absolute values.

13. A display device, comprising:
   a display panel including a plurality of red, green, blue, and white sub pixels; and
   an image processing unit configured to:
   generate a first image including scaled versions of luminance values of an input image;
   generate a second image including scaled versions of hue values of the input image;
   generate a third image including scaled versions of saturation values of the input image;
   generate a fourth image including block absolute values in which a distance between pixels of the input image is considered;
   calculate a color contrast ratio of the input image by multiplying at least the first, second, third, and fourth images; and
   generate a four-color output image by processing another input image subsequent to the input image using the color contrast ratio for display on the display panel.

14. The display device of claim 13, wherein the image processing unit is further configured to:
   determine a plurality of blocks of a processed version of the input image;
   determine first blocks of the plurality of blocks having a first average saturation value;
   determine second blocks of the plurality of blocks having a second average saturation value greater than the first average saturation value; and
   perform interpolation at a boundary area between the first blocks and the second blocks.

15. The display device of claim 14, wherein the image processing unit is further configured to:
   determine interpolation values of the pixels of the input image using the interpolation performed at the boundary area;
   wherein the color contrast ratio is calculated using at least the interpolation values.

16. The display device of claim 15, wherein the image processing unit is further configured to:
   determine an average gain of the plurality of blocks;
   determine the block absolute values of the pixels of the input image by calculating differences between the average gain and the interpolation values;
   generate the fourth image including the block absolute values; and
   wherein the color contrast ratio is calculated using at least the block absolute value.

17. The display device of claim 14, wherein the first blocks represent a chromatic area of the input image and the second blocks represent an achromatic area of the input image.

18. The display device of claim 13, wherein the scaled versions of hue values include first values and second values, the first values corresponding to yellow Y, cyan C, and magenta M colors of the four-color image data, the second values corresponding to other colors of the four-color image data, the first values greater than the second values.

* * * * *